(12) United States Patent
Yao

(10) Patent No.: US 7,612,475 B2
(45) Date of Patent: Nov. 3, 2009

(54) CEILING FAN MOTOR

(76) Inventor: Chao-Chin Yao, 8F-2, No. 13, Lane 238, Ssu-Ping Rd., Pei Tun Dist., Taichung City (TW)

( * ) Notice: Subject to any disclaimer, the term of this patent is extended or adjusted under 35 U.S.C. 154(b) by 326 days.

(21) Appl. No.: 11/713,133

(22) Filed: Feb. 28, 2007

(65) Prior Publication Data

US 2008/0100161 A1   May 1, 2008

(30) Foreign Application Priority Data

Oct. 26, 2006   (TW) .............................. 95218953 U

(51) Int. Cl.
*H01K 5/00* (2006.01)
(52) U.S. Cl. .................. 310/89; 310/67 R; 310/261
(58) Field of Classification Search ............... 310/67 R, 310/89, 261, 156.12, 62–63, 156.26
See application file for complete search history.

(56) References Cited

U.S. PATENT DOCUMENTS

| | | | | |
|---|---|---|---|---|
| 4,505,031 A * | 3/1985 | Colwell et al. ................. 29/596 |
| 5,439,352 A * | 8/1995 | Line ........................ 416/170 R |
| 5,441,387 A * | 8/1995 | Yu ................................. 416/5 |
| 5,503,524 A * | 4/1996 | Yu ................................. 416/5 |
| 5,681,147 A * | 10/1997 | Yung-Chung ........... 416/244 R |
| 5,883,449 A * | 3/1999 | Mehta et al. ............... 310/60 R |
| 6,400,051 B1 * | 6/2002 | Hsieh .......................... 310/89 |
| 6,798,098 B1 * | 9/2004 | Tai ............................ 310/67 R |
| 7,066,721 B2 * | 6/2006 | Bird ........................ 417/423.8 |
| 2003/0218396 A1 * | 11/2003 | Hsieh .......................... 310/89 |

* cited by examiner

*Primary Examiner*—Thanh Lam
(74) *Attorney, Agent, or Firm*—David N. Lathrop

(57) ABSTRACT

A ceiling fan motor includes a housing having top and bottom casing parts, a stator disposed in the housing and having a stator axis, and a rotor unit including a mounting seat that has an inner tubular wall surrounding the stator, an outer tubular wall spaced apart from and surrounding the inner tubular wall, and an intermediate web interconnecting the inner and outer tubular walls. The outer tubular wall is connected between the top and bottom casing parts. The rotor unit further includes a rotor supported by the inner tubular wall. The top and bottom casing parts have peripheral ends respectively overlapping top and bottom ends of the outer tubular wall.

2 Claims, 6 Drawing Sheets

CEILING FAN MOTOR

CROSS-REFERENCE TO RELATED APPLICATION

This application claims priority of Taiwanese Application No. 095218953, filed on Oct. 26, 2006.

BACKGROUND OF THE INVENTION

1. Field of the Invention

The invention relates to a motor, more particularly to a ceiling fan motor.

2. Description of the Related Art

Referring to FIGS. 1 and 2, a conventional ceiling fan motor 100 includes a motor housing having top and bottom casing parts 11, 12, a stator 13 disposed between the top and bottom casing parts 11, 12, and a rotor 14 connected to the top and bottom casing parts 11, 12 and surrounding the stator 13. When choosing the size of the stator 13 and the rotor 14, reference must be made to the standard specifications of the top and bottom casing parts 11, 12. Since such standard specifications of the top and bottom casing parts 11, 12 are not suitable for small motors, the stator 13 and the rotor 14 of the conventional ceiling fan motor 100 necessarily must be made having large volumes. This contributes to increases in the cost and the weight of the motor 100. Further, since the sizes of the stator 13 and the rotor 14 are limited by the standard specifications of the top and bottom casing parts 11, 12, the conventional ceiling fan motor 100 cannot be designed flexibly so as to provide a desired power output.

SUMMARY OF THE INVENTION

Therefore, the object of the present invention is to provide a ceiling fan motor that is capable of overcoming the aforementioned drawbacks of the prior art.

According to this invention, a ceiling fan motor comprises a housing having top and bottom casing parts, a stator disposed in the housing and having a stator axis, and a rotor unit. The rotor unit includes a mounting seat that has an inner tubular wall surrounding the stator, an outer tubular wall spaced apart from and surrounding the inner tubular wall, and an intermediate web interconnecting the inner and outer tubular walls. The outer tubular wall is connected between the top and bottom casing parts. The rotor unit further includes a rotor supported by the inner tubular wall. The top and bottom casing parts have peripheral ends respectively overlapping top and bottom ends of the outer tubular wall.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
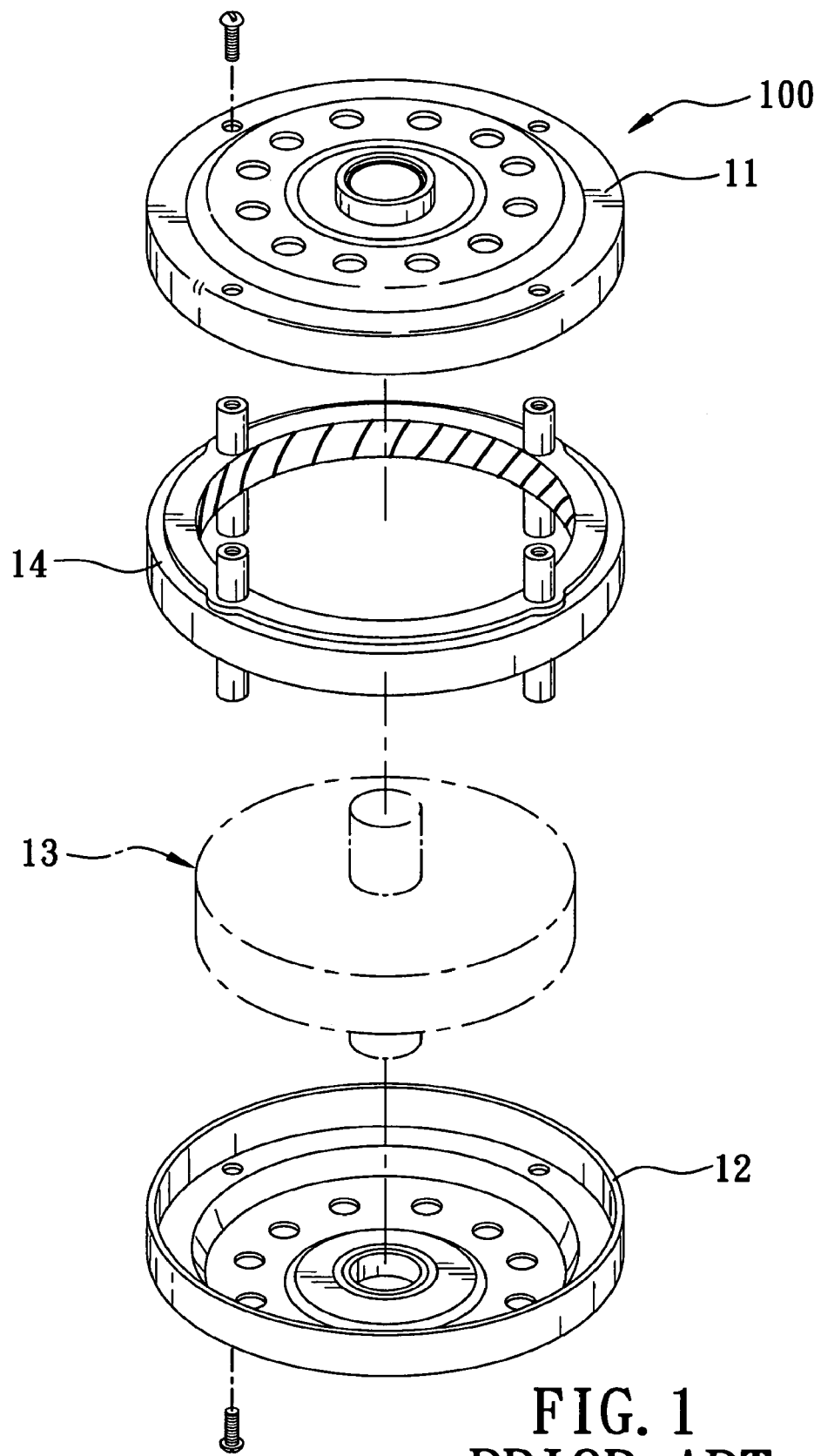
FIG. 1 is an exploded perspective view of a conventional ceiling fan motor.
Figure 2:
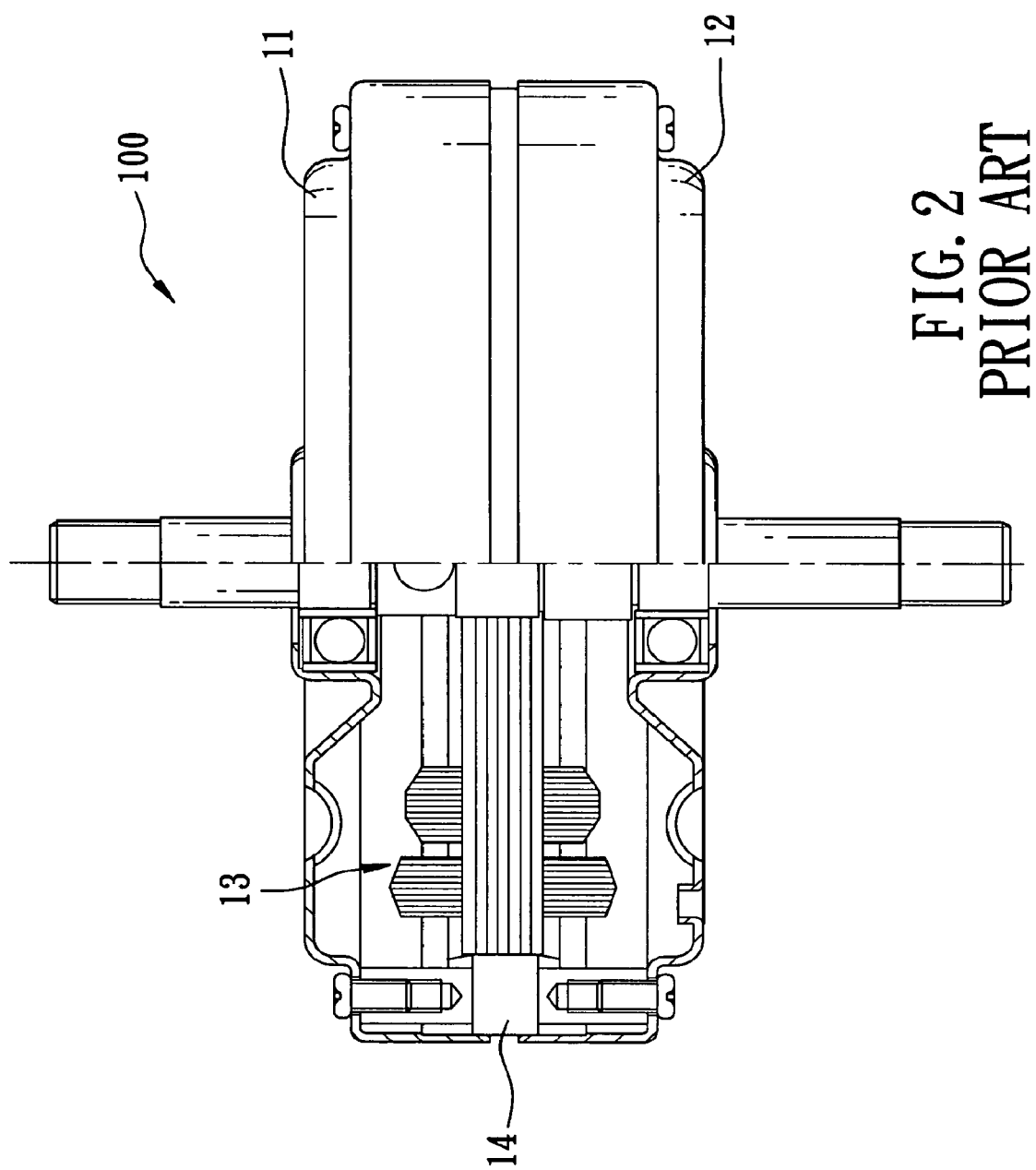
FIG. 2 is a schematic partly sectional view of the conventional ceiling fan motor of FIG. 1 in an assembled state.

Before the present invention is described in greater detail, it should be noted that like elements are denoted by the same reference numerals throughout the disclosure.

Figure 3:
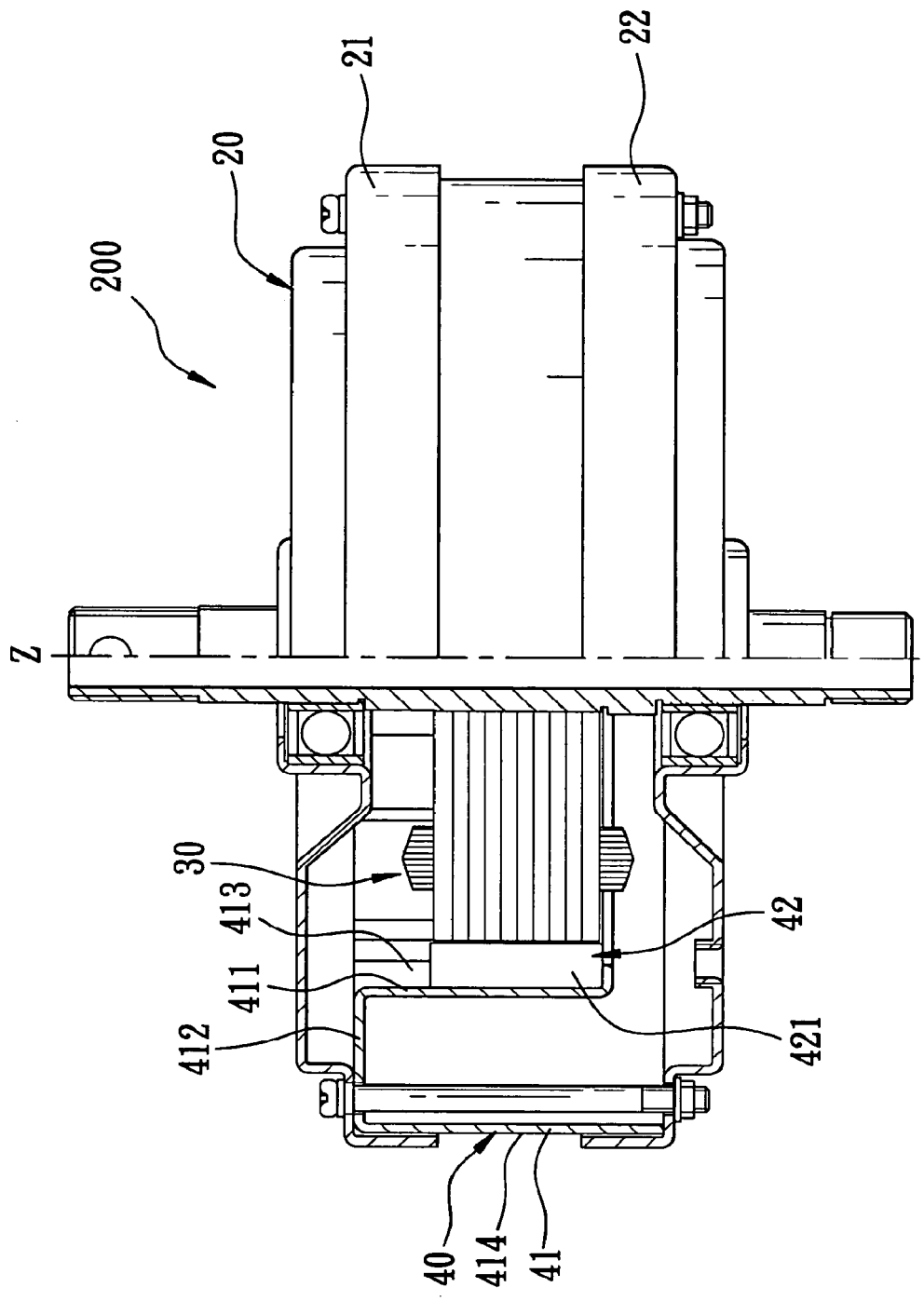
FIG. 3 is a schematic party sectional view of the first preferred embodiment of a ceiling fan motor according to the present invention in an assembled state.
Figure 4:
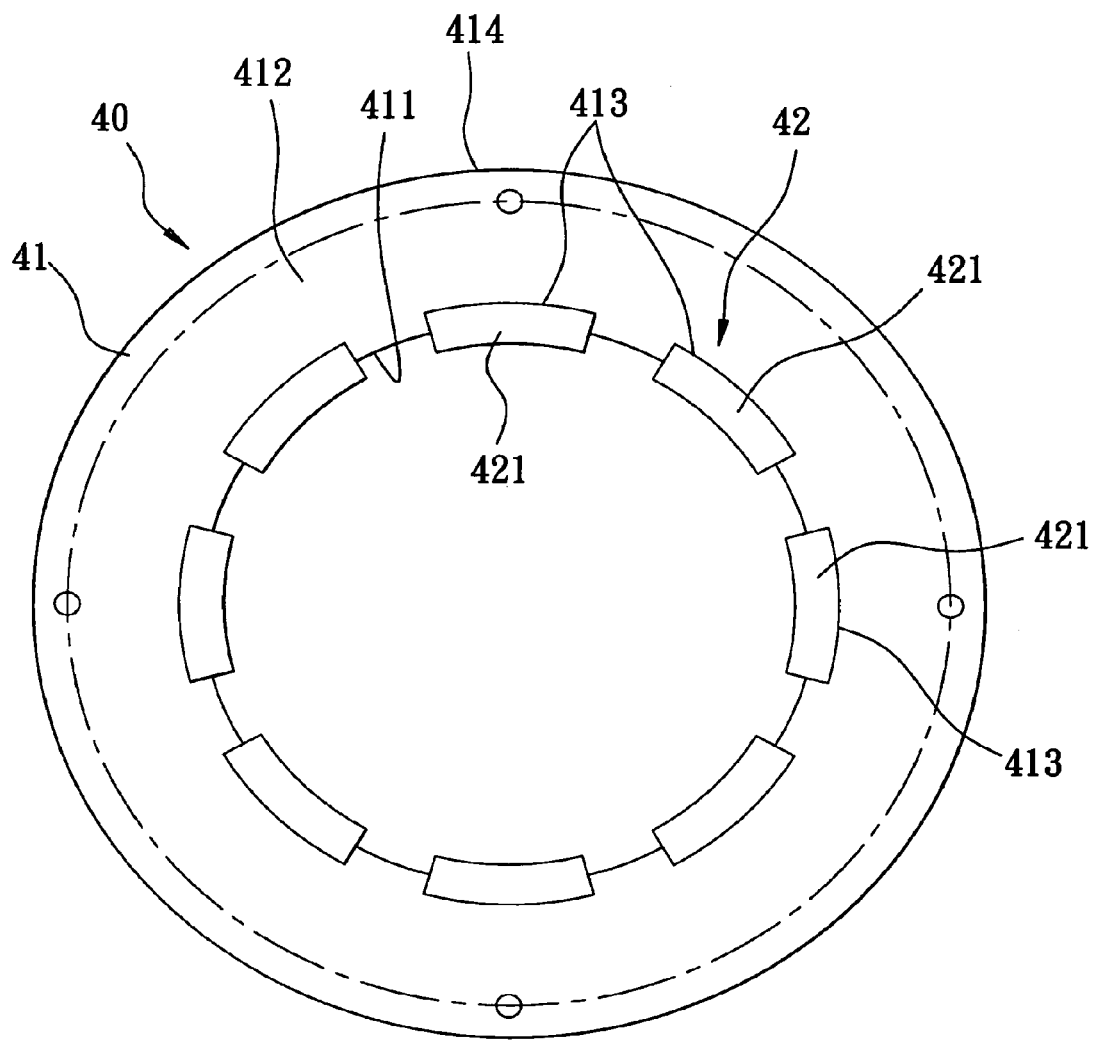
FIG. 4 is a top schematic view of the first preferred embodiment with a top casing part removed.

Referring to FIGS. 3 and 4, the first preferred embodiment of a ceiling fan motor 200 according to the present invention is shown to comprise a housing 20, a stator 30, and a rotor unit 40.

The housing 20 includes top and bottom casing parts 21, 22.

The stator 30 is disposed in the housing 20 between the top and bottom casing parts 21, 22, and has a stator axis (Z).

The rotor unit 40 includes a mounting seat 41 connected to the housing 20 and surrounding the stator 30, and a rotor 42 disposed on the mounting seat 41 adjacent to the stator 30.

The mounting seat 41 includes an inner tubular wall 411 surrounding the stator 30, an outer tubular wall 414 spaced apart from and surrounding the inner tubular wall 411, an intermediate web 412 interconnecting top ends of the inner and outer tubular walls 411, 414, and a plurality of angularly spaced-apart mounting grooves 413 formed in the inner tubular wall 411 and facing the stator 30. The outer tubular wall 414 is connected between the top and bottom casing parts 21, 22. The top and bottom casing parts 21, 22 have peripheral ends respectively overlapping top and bottom ends of the outer tubular wall 414.

The rotor 42 is supported by the inner tubular wall 411. In this embodiment, the rotor 42 has a plurality of magnets 421 disposed in the mounting grooves 413, respectively. Alternatively, the rotor 42 may have an annular magnet mounted on the inner tubular wall 411.

Since the mounting seat 41 of the rotor unit 40 has the outer tubular wall 414 that couples with the top and bottom casing parts 21, 22 to enclose the rotor unit 40 and the stator 30 within the housing 20, and since the inner tubular wall 411 that supports the rotor 42 has a diameter or size smaller than the outer tubular wall 414, the stator 30 can be provided with a diameter or size smaller than the outer tubular wall 414, the inner tubular wall 411 can be adjacent to the smaller stator 30, and the rotor 42 can be made small to match the size of the stator 30. While the size of the outer tubular wall 414 is limited by the size of the top and bottom casing parts 21, 22, the size of the inner tubular wall 411 is not limited by the standard size of the top and bottom casing parts 21, 22. Therefore, a manufacturer may produce the ceiling fan motor 200 using different sizes of the stator 30 and the rotor unit 40. This allows not only the minimization of the cost of the ceiling fan motor 200, but also design flexibility of the ceiling fan motor 200 of the present invention.

Figure 5:
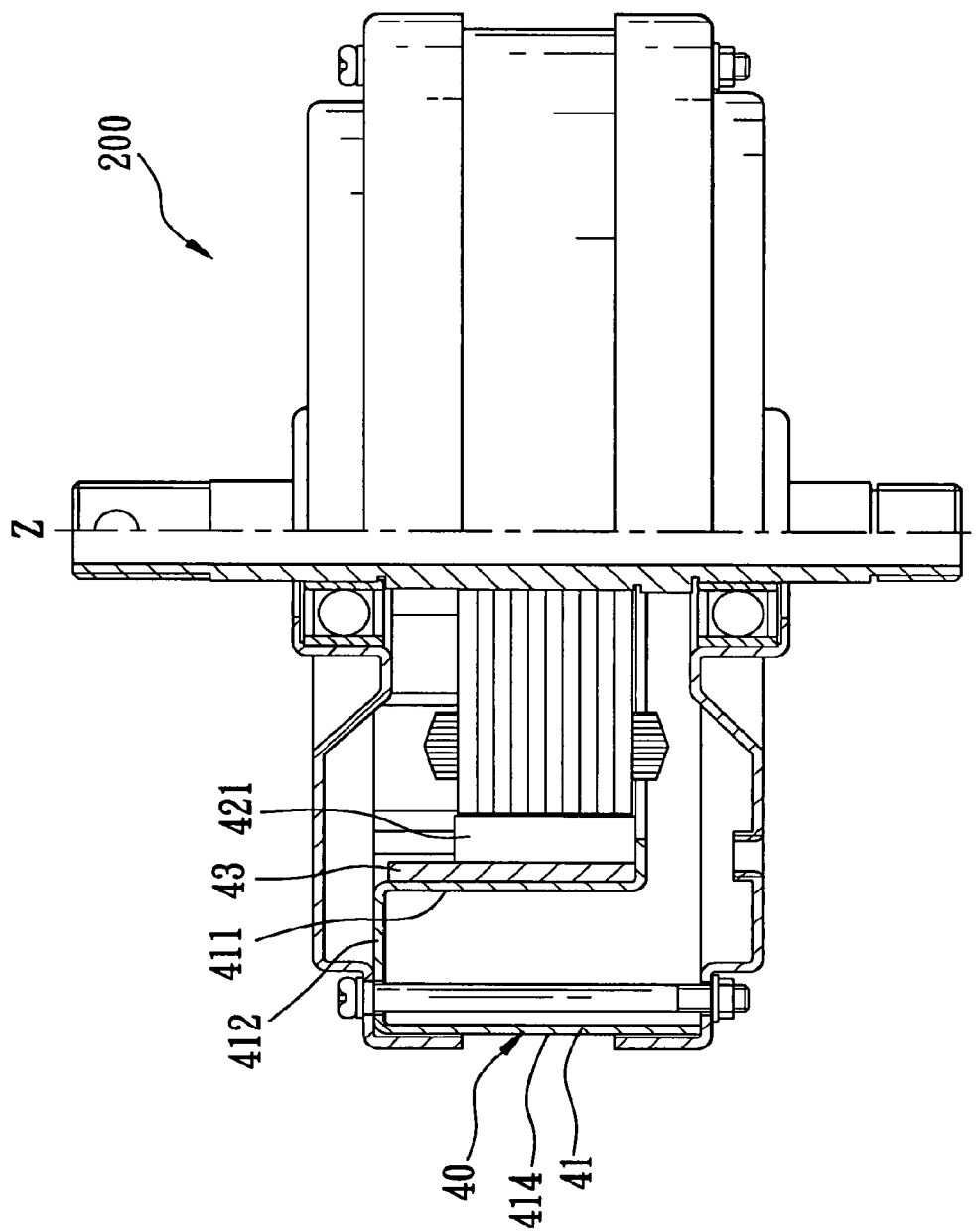
FIG. 5 is a schematic partly sectional view of the second preferred embodiment of a ceiling fan motor according to the present invention in an assembled state.
Figure 6:
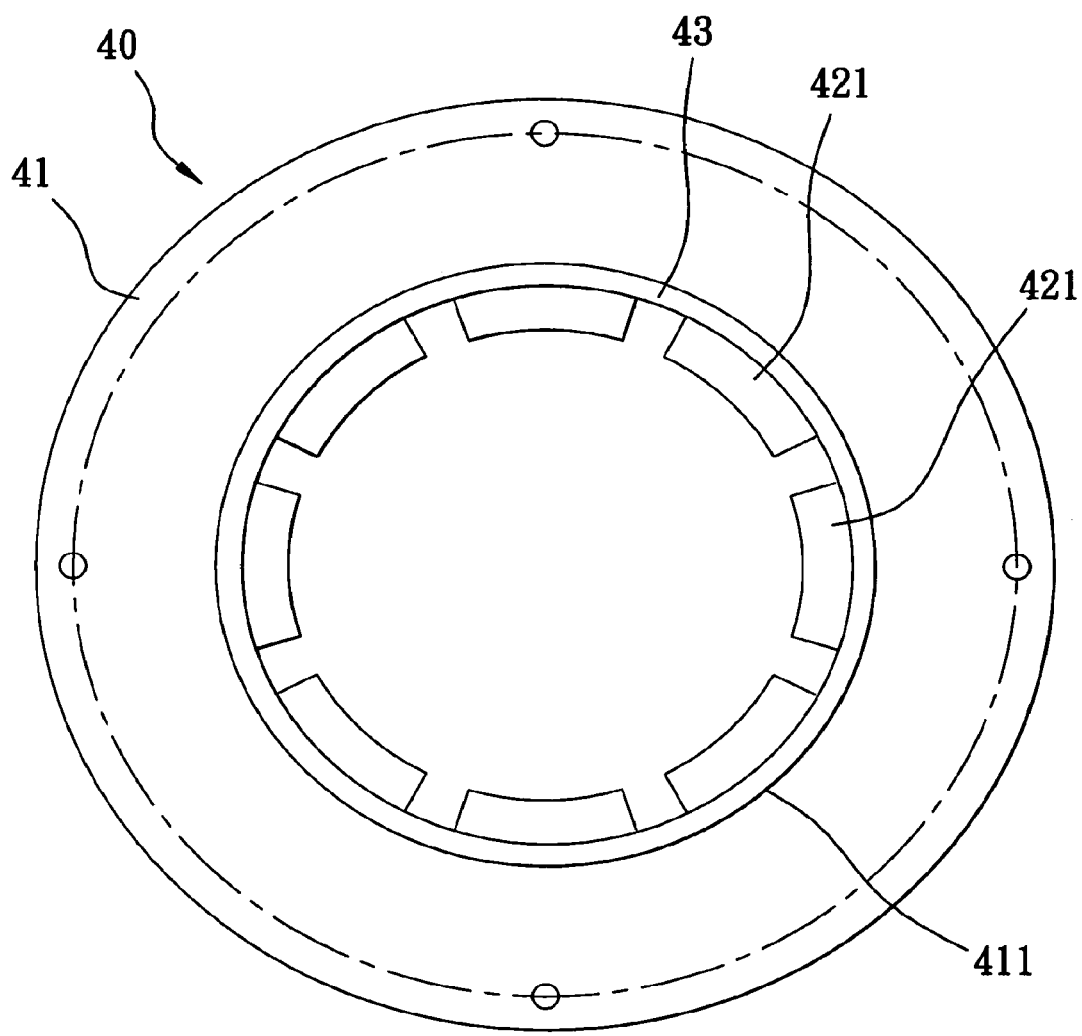
FIG. 6 is a top schematic view of the second preferred embodiment with a top casing part removed.

Referring to FIGS. 5 and 6, the ceiling fan motor 200 according to the second preferred embodiment of the present invention is shown to be similar to the first preferred embodiment. However, in this embodiment, the rotor unit 40 further includes a supporting ring 43 sleeved into the inner tubular wall 411 of the mounting seat 41 and surrounding the stator 30. The rotor 42 has a plurality of angularly spaced-apart magnets 421 attached to the supporting ring 43 and surrounding the stator 30. In this embodiment, the thickness of the supporting ring 43 can be varied so as to suit different sizes of the stator 30.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A ceiling fan motor comprising:
   a housing having top and bottom casing parts;
   a stator disposed in said housing and having a staler axis; and
   a rotor unit including a mouting seat that has an inner tubular wall surrounding said stator, an outer tubular wall spaced apart from and surrounding said inner tubular wall, and an intermediate web interconnecting said inner and outer tubular walls, said outer tubular wall being connected between said top and bottom casing parts, said rotor unit further including a rotor supported by said inner tubular wall, said top and bottom casing parts having peripheral ends respectively overlapping top and bottom ends of said outer tubular wall.

2. The ceiling fan motor of claim 1, wherein said rotor unit further includes a supporting ring sleeved into said inner tubular wall of said mouting seat, said rotor having a plurality of angularly spaced-apart magnets attached to said supporting ring and surrounding said stator.

* * * * *